July 23, 1935.  H. A. ARMBRUSTER  2,009,285
BOX COVERING MACHINE
Filed Jan. 30, 1934  7 Sheets-Sheet 4
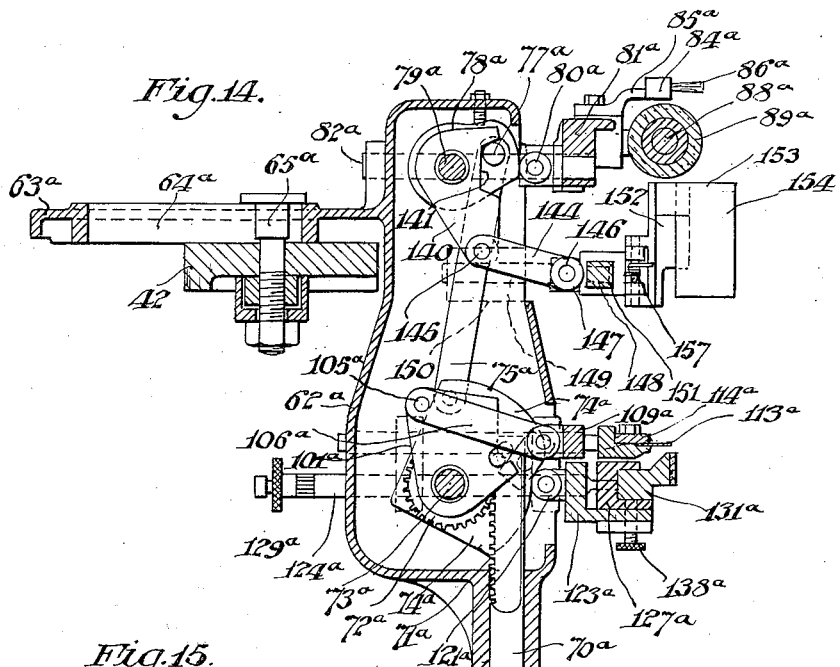
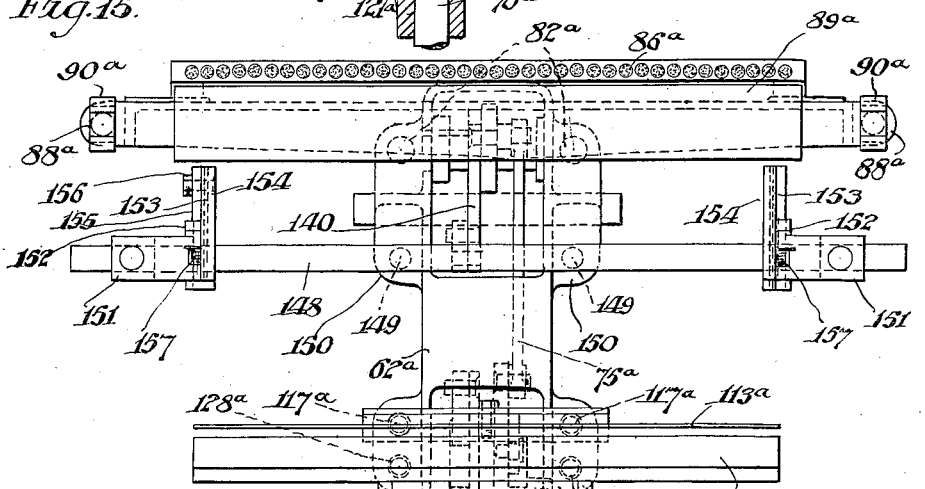
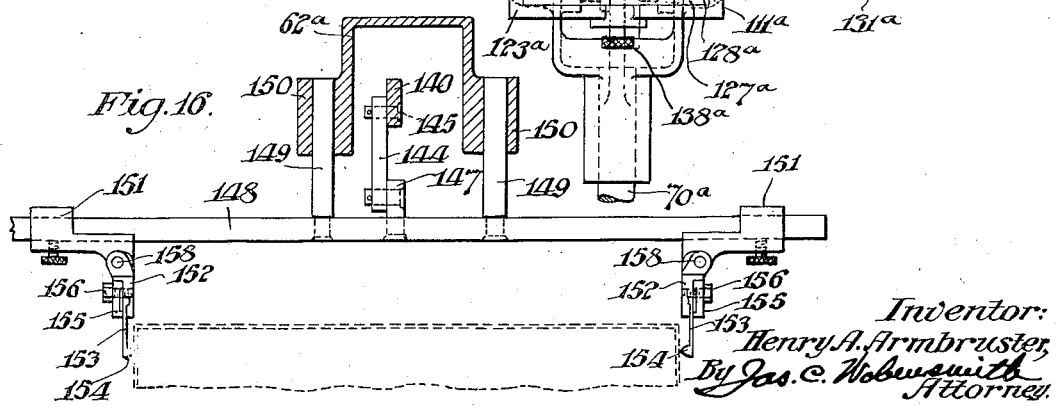
Inventor:
Henry A. Armbruster,
By Jas. C. Hobsmith
Attorney.

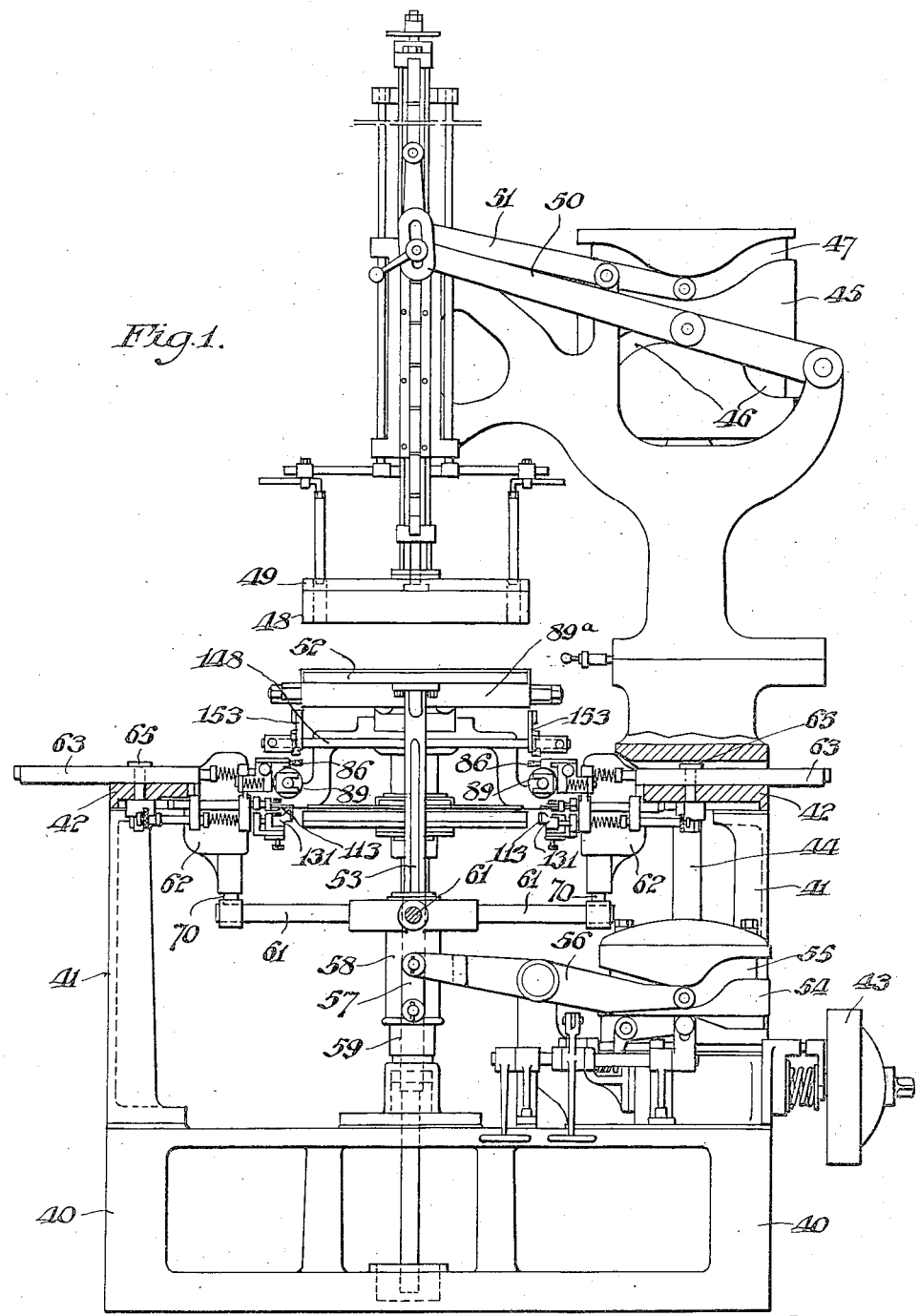

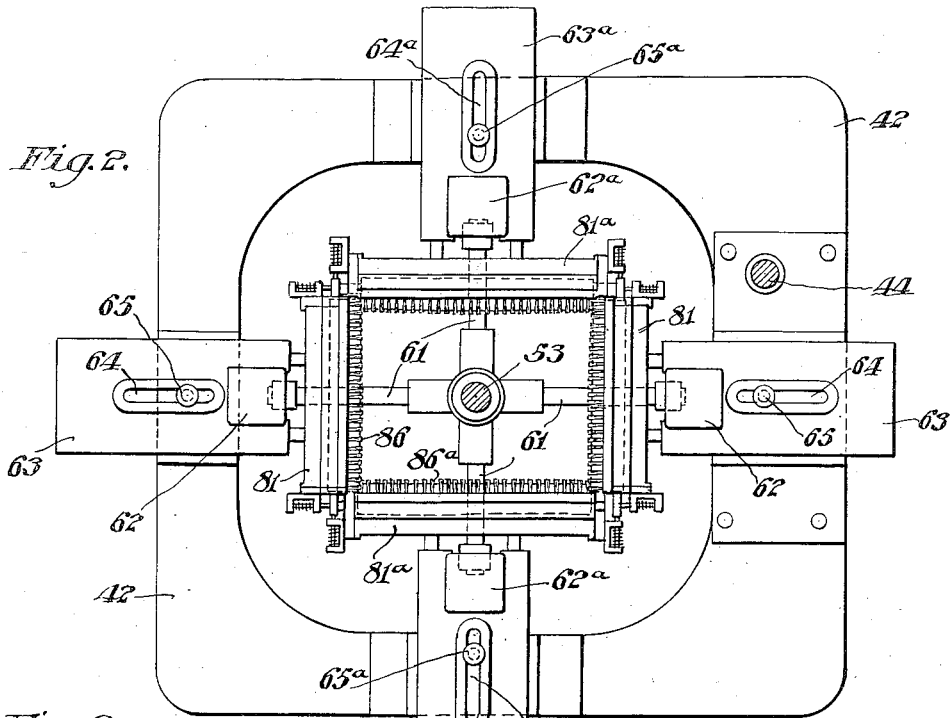
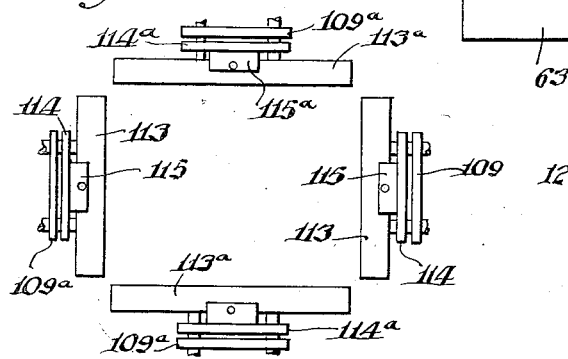
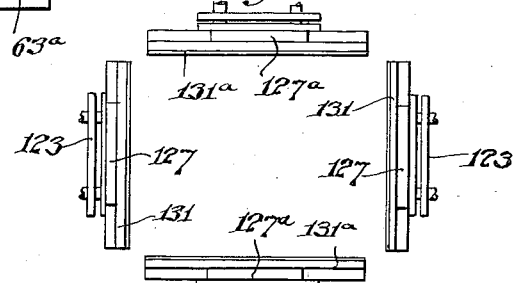
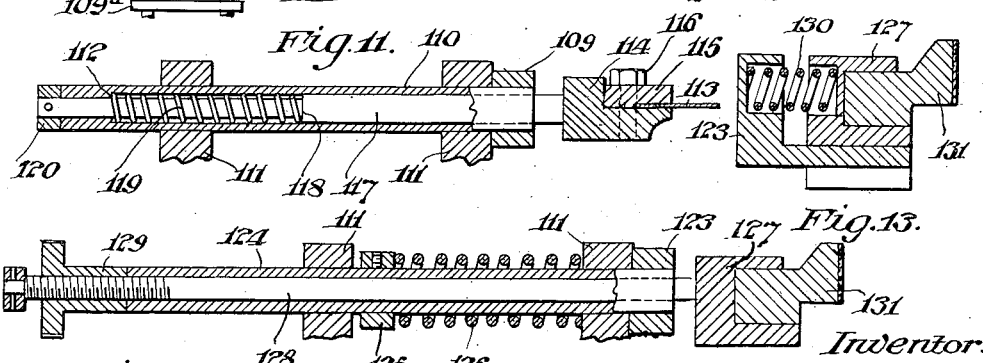
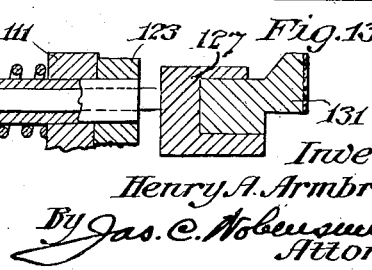

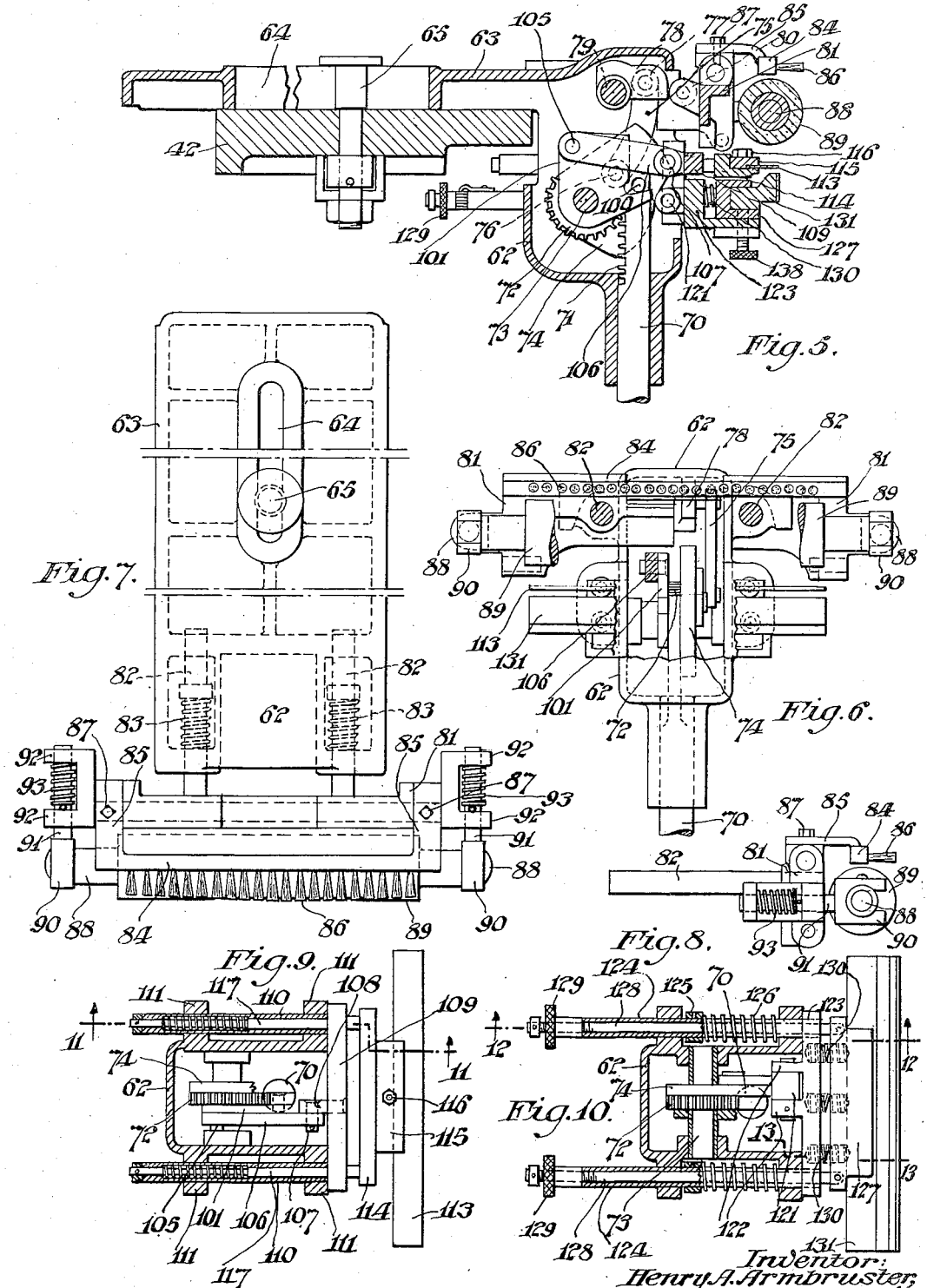

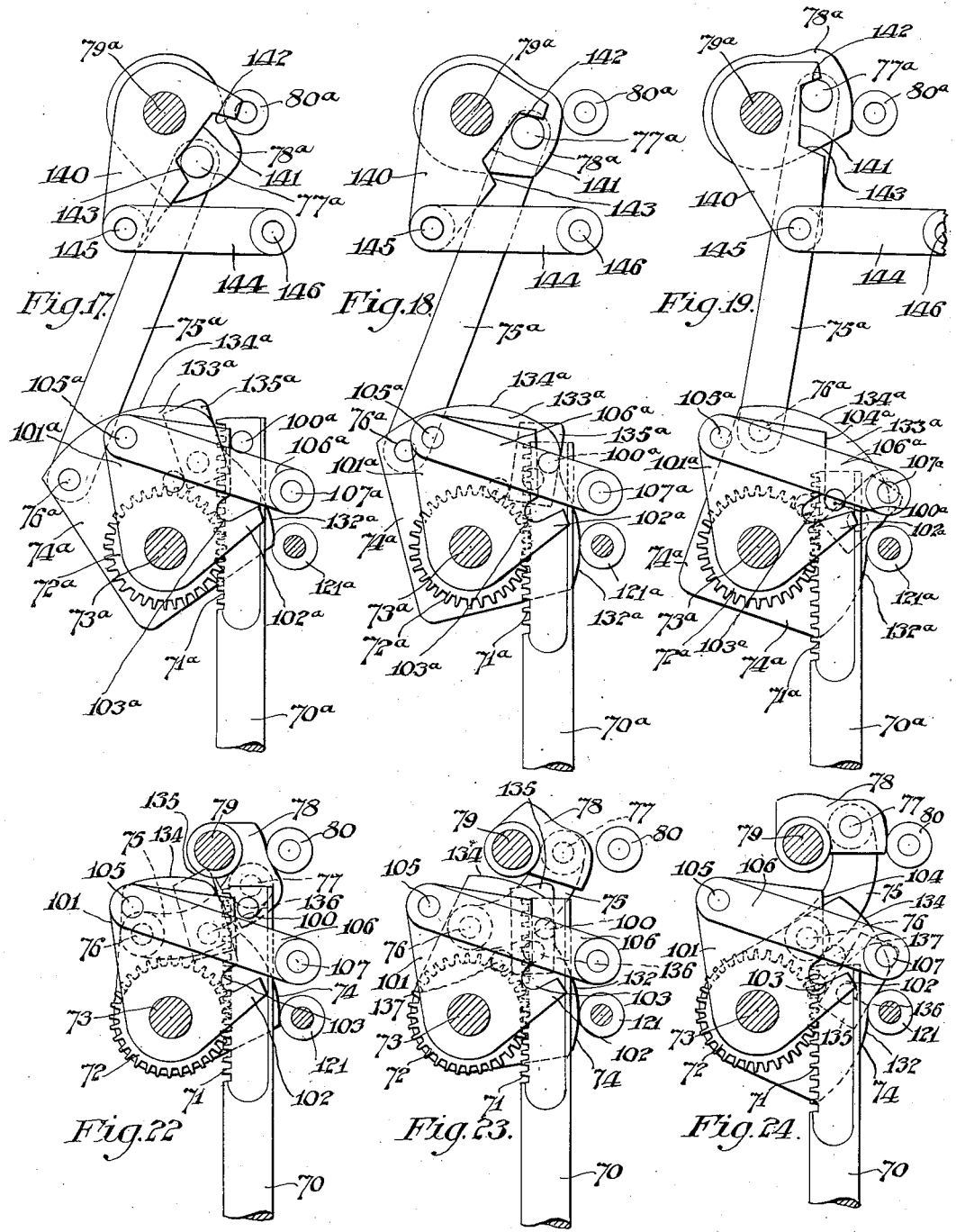

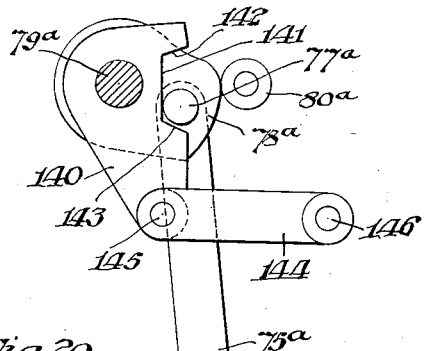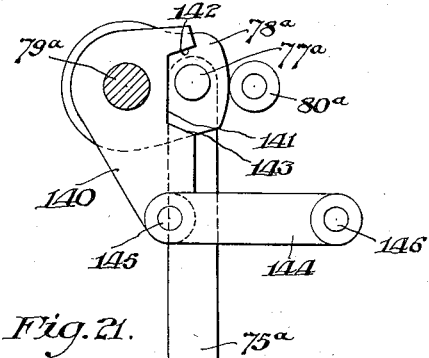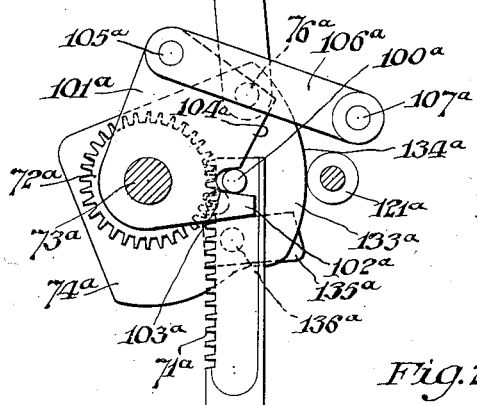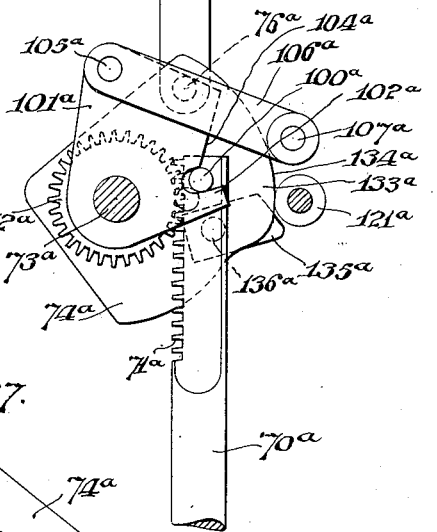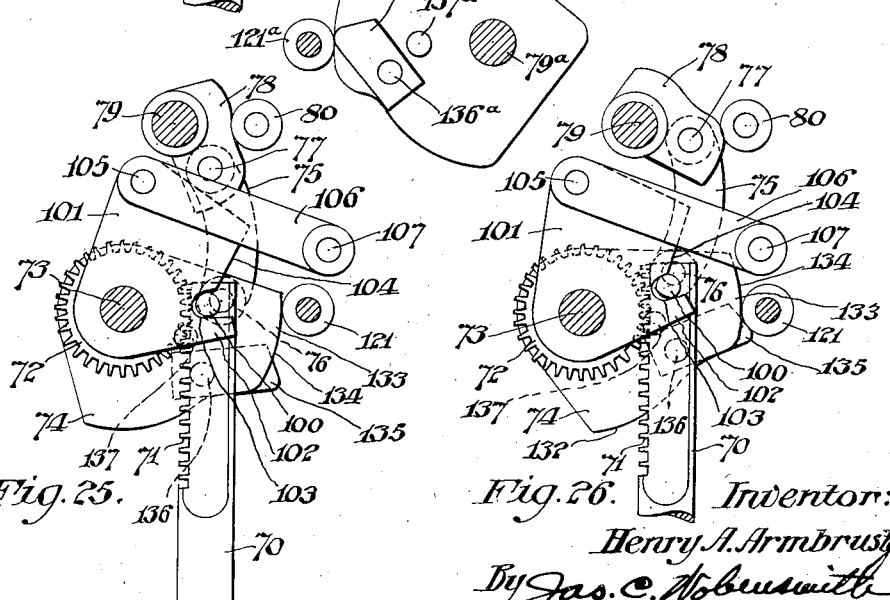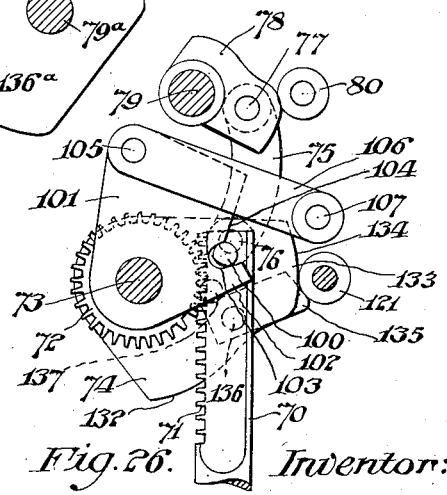

July 23, 1935.  H. A. ARMBRUSTER  2,009,285
BOX COVERING MACHINE
Filed Jan. 30, 1934   7 Sheets-Sheet 7

Inventor:
Henry A. Armbruster,
By Jas. C. Hobensmith
Attorney.

Patented July 23, 1935

2,009,285

UNITED STATES PATENT OFFICE 2,009,285

BOX COVERING MACHINE

Henry A. Armbruster, Milwaukee, Wis., assignor, by mesne assignments, to High Production Machine Company, Inc., Philadelphia, Pa., a corporation of Pennsylvania Application January 30, 1934, Serial No. 708,962

25 Claims. (Cl. 93—54)

My invention relates to box covering machines, and it relates more particularly to a machine by means of which a cover sheet or wrapper is applied to a set-up or stayed box.

For many years there has been in common use, and well known, a type of machine for covering paper boxes in which the box proper, having previously been formed and stayed, is placed on a two-part form block, and a cover sheet of the proper shape, with an adhesive on one face thereof, is placed on a platen beneath the box on the form block, after which the form block and platen are moved downwardly through the machine, carrying the box and cover sheet therewith. As the box and cover sheet are thus carried downwardly, the side and end flaps of the cover sheet are brought into engagement with suitable devices and operated on, thereby to cause the various flaps of the cover sheet to be brought into proper relationship with respect to the box, the operations occurring in the following order:

The side flaps are first brought into position against the outer surfaces of the side portions of the box. The corner flaps, which constitute extensions of the side flaps, are then brought around against the end portions of the box. The end flaps are then brought into position against the outer surfaces of the end portions of the box. The edge portions of the flaps are then bent over to horizontal positions, then pushed downwardly on the inside of the side and end portions, respectively, of the box, after which pressure is applied to the turned in edge portions.

My invention relates more particularly to improved means for performing the aforesaid operations of the wrapper applying devices in a machine of this type. The construction and arrangement of the form blocks and platen, and the mechanism for initially imparting movement to the wrapper applying devices, may be substantially similar to those of the machines of this general type at present in common use.

The principal object of my present invention is to provide, in a machine of the character aforesaid, improved means for applying the flaps of the cover sheet or wrapper to the sides and ends of the box, whereby the machine will be rendered more positive and certain in its action, a better quality of work will be performed by the machine, the speed thereof may be increased, and the parts made more durable and lasting.

A further object of my invention is to provide, in such a machine, mechanism for actuating the devices which apply the flaps of the cover sheet to the box, which mechanism is so constructed and arranged that said devices may be retracted to a greater extent than heretofore, so that the machine may be readily adapted to be used in connection with boxes having flanges or extending portions, as well as for simpler forms of boxes.

The nature and characteristic features of my invention will be more readily understood from the following description, taken in connection with the accompanying drawings forming part hereof, in which:

Figure 1 is a side elevation of a box covering machine having incorporated therein devices embodying the main features of my present invention, certain parts being removed and other parts being shown in section to illustrate the construction and arrangement more clearly;

Fig. 2 is a horizontal plan of the lower portion of the machine, illustrating the arrangement of the cover applying devices, the platen being removed and the standard for actuating the same, upon which it is mounted, being shown in section;

Fig. 3 is a fragmentary plan view, illustrating the arrangement of the fingers for turning in the edge portions of the side and end flaps;

Fig. 4 is a similar view, illustrating the arrangement of the presser bars for imparting pressure to the turned in portions of the side and end flaps;

Fig. 5 is a vertical, central section, illustrating one set of devices for operating on the end flaps of the cover sheet, and the mechanism for actuating the same;

Fig. 6 is an elevational view, looking from the central portion of the machine, of the parts shown in Fig. 5, certain parts being broken away;

Fig. 7 is a top or plan view of the structure shown in Fig. 5;

Fig. 8 is an end elevation of a portion of the structure shown in Fig. 5;

Fig. 9 is a fragmentary plan view, partly in section, of a portion of the structure shown in Fig. 5, illustrating more particularly certain of the mechanism for effecting the initial turnover of the top edge portions of the end flaps;

Fig. 10 is a fragmentary plan view, partly in section, illustrating the means for imparting pressure to the top edge portions of the end flaps after the same have been turned over and inwardly on the box;

Fig. 11 is an enlarged sectional view, taken approximately on the line 11—11 of Fig. 9;

Fig. 12 is an enlarged sectional view, taken approximately on the line 12—12 of Fig. 10;

Fig. 13 is an enlarged sectional view, taken approximately on the line 13—13 of Fig. 10;

Fig. 14 is a sectional view similar to Fig. 5, but illustrating the construction and arrangement of the devices for operating on the side flaps of the cover sheet, and the mechanism for actuating the same.

Fig. 15 is an elevational view, looking from the central portion of the machine, of the parts shown in Fig. 14;

Fig. 16 is a fragmentary plan view of a portion of the apparatus shown in Figs. 14 and 15, illustrating more particularly the devices for turning in the corner flaps which extend from the ends of the side flaps;

Figs. 17, 18, 19, 20 and 21 are detached enlarged elevational views, partly in section, illustrating the mechanism for actuating the devices which operate on the side flaps of the cover sheet, the parts being respectively shown in the various positions assumed during successive operations;

Figs. 22, 23, 24, 25 and 26 are similar views of the mechanism for actuating the devices which operate on the end flaps of the cover sheet, the parts being respectively shown in the various positions assumed during successive operations;

Figure 28:
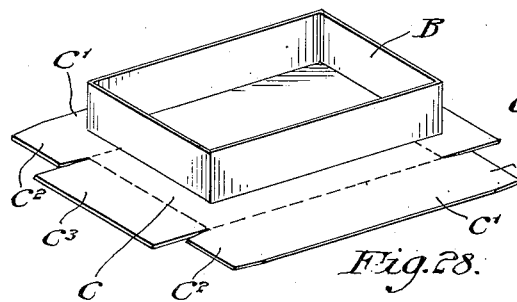

Fig. 27 is an elevational view of the reverse side of one of the cams shown in Figs. 17 to 21, inclusive, and certain of the parts associated therewith, illustrating more particularly the manner of operation of the pivoted auxiliary cam member carried by said cam; and Figs. 28, 29, 30, 31, 32, 33 and 34 are perspective views illustrating the successive operations performed by the machine in applying the cover sheet to the box.

Referring to the drawings, 40 is the base frame of the machine, to which upwardly extending columns 41 are secured. Upon the upper ends of the columns 41 there is mounted a table 42, to which the devices of my present invention, which will be hereinafter more particularly described, are adjustably attached.

Power may be supplied to the machine in any suitable manner, such for example as by the driving pulley 43. The power is transmitted from the pulley 43 by suitable mechanism (not shown) to the main operating shaft 44 of the machine, which extends vertically therein. Upon the upper end of the shaft 44 there is mounted a cam drum 45, provided with suitable cam slots for operating the form blocks upon which the box is mounted while the cover sheet is being applied thereto, one cam slot 46 being provided for the main form block 48, and another cam slot 47 being provided for the auxiliary form block 49.

The movement imparted by the cam slot 46 is transmitted by lever 50, and the movement imparted by the cam slot 47 is transmitted by lever 51. The form blocks are so mounted as to be vertically reciprocable, and the respective cam slots are so shaped as to cause the form blocks to be brought to the proper positions at the desired times while the various operations are being performed. It is not deemed necessary to describe in detail the construction and arrangement of the mechanism for actuating the form blocks, as the same are substantially identical, at least in principle, with those of the machines which are well known and have been in common use for many years.

The usual platen 52 is provided below the form blocks, the same being supported on the upper end of a standard 53. The platen 52, and the standard 53 upon which it is mounted, are vertically movable in the machine, being actuated by suitable mechanism (not shown) which, as in the case of the form blocks, may be the same in principle and construction as that heretofore used in machines of this type. It should be borne in mind that the platen 52 also moves to various positions, in timed relationship with the other moving parts of the machine, while the successive operations are being performed.

The main vertical operating shaft 44 also carries a cam drum 54 having a suitably shaped cam slot 55. The movement imparted by the cam slot 55 is transmitted by lever 56 and link 57 to a sleeve 58 which is vertically movable on a standard 59. The standard 59 is mounted on the base frame 40 of the machine, and may also serve as a means for guiding the standard 53 to which the platen 52 is secured. The sleeve 58 is provided with four horizontally extending arms 61 for actuating the cover applying devices.

All of the parts hereinbefore described may be substantially similar in construction and principle to those in the machines which have been in common use for many years, and no claim is made for the same per se, it being understood that the present invention relates more particularly to the devices co-operating with the foregoing mechanism and actuated thereby.

The devices for operating upon the end flaps of the cover sheet are shown in detached detail in Figs. 5 to 10, inclusive, of the drawings. In Figs. 22 to 26, inclusive, the mechanism for actuating these devices is shown in enlarged detail, with the parts thereof in the positions assumed at successive stages in the operation of the machine.

Referring now more particularly to Figs. 5 to 10, inclusive, of the drawings, 62 is a housing in which most of the actuating mechanism for these devices is mounted, the housing also serving as a means of support for the parts which are mounted externally thereof. The housing 62 is provided with a horizontal extension 63 having a slot 64 through which a bolt 65 extends, whereby said horizontal extension may be adjustably secured to a portion of the table 42.

A vertical rod 70 is slidably mounted in the lower portion of the housing 62, and the lower end of this rod is connected to one of the horizontal arms 61, hereinbefore referred to. The vertical rod 70 is provided with rack teeth 71 which engage a pinion 72 journaled on a shaft 73 mounted in the housing 62.

The pinion 72 is secured to a cam 74, which is also journaled on the shaft 73. A link 75 has one end connected to the cam 74 by means of a pivot pin 76 carried by said cam. The other end of the link 75 is connected by means of a pivot pin 77 to a cam 78 which is journaled on another shaft 79 mounted in the upper part of the housing 62.

A roller 80 bears against the working face of the cam 78. This roller 80 is carried by the brush and roller carriage 81. The brush and roller carriage 81 is provided with rearwardly extending rods 82 which are slidably mounted in a suitable portion of the housing 62. Springs 83 mounted on the rods 82 serve to impel the brush and roller carriage rearwardly, and thus hold the roller 80 against the working face of the cam 78.

The brush bar 84 is provided with rearwardly extending arms 85 whereby the brush 86 is secured to the carriage 81 by means of bolts 87. The shaft 88 of the pressing roller 89 is mounted at each end in an auxiliary bracket 90, which is provided with a rearwardly extending rod 91 which is slidably mounted in lugs 92 carried by the carriage 81. A spring 93 surrounds each of the rods 91, these springs serving to hold the pressing roller 89 forwardly in the carriage, yet providing a resilient means for permitting said roller to be slightly retracted to take care of inequalities in the work.

The vertical rod 70, which is provided with rack teeth 71 which engage the pinion 72, is also provided near its upper end with a projecting pin 100, which engages a rotatable member 101, also journaled on the shaft 73 upon which the pinion 72 is journaled. This rotatable member 101 carries a projecting finger 102, which is engaged by the pin 100 when the rod 70 moves downwardly and thereby rotates the member 101. The member 101 is also provided with a recess 103 adjacent the finger 102, to permit said member 101 to be rotated without jamming. The member 101 has a straight surface 104 adjacent the recess 103, so that as the rod 70 is moved upwardly after the member 101 has been moved to a certain position, said member may then remain idle.

The member 101 is provided with a pivot pin 105, to which one end of a link 106 is pivotally connected. The other end of said link 106 is pivotally connected, by means of a pin 107, to a lug 108 carried by a transversely extending bar 109. The ends of the bar 109 are mounted on sleeves 110, which extend rearwardly and are slidably mounted in lugs 111 extending from the sides of the housing 62. Each of the sleeves 110 is provided with an internal shoulder 112 at its rear end.

The folding finger 113 is secured to a carriage 114 by means of a clamping bar 115 and a bolt 116, so that folding fingers of various lengths may be readily substituted, one for another.

The folding finger carriage 114 is provided with rearwardly extending rods 117, which are slidably mounted in the sleeves 110 to which the transverse bar 109 is secured. The rear ends of the rods 117 are reduced in diameter, thereby providing a shoulder internally of each sleeve, as at 118. A coil spring 119 surrounds each rod 117, being interposed between the shoulder 112 provided on the sleeve 110, and the shoulder 118 provided on the rod 117.

The springs 119 are under tension, and serve to hold the finger folding carriage 114 in its normal position, with respect to the transverse bar 109, this position being determined by collars 120 mounted on the rear ends of the rods 117. The collars 120 abut against the rear ends of the sleeves 110 for this purpose. By the foregoing arrangement, there will be no danger of breakage in the event that the folding finger 113 encounters an obstruction when the same is actuated by the rotatable member 101.

A roller 121 bears against the working face of the cam 74 which is secured to the pinion 72. The roller 121 is journaled in lugs 122 projecting from the rear side of a transverse bar 123. The end portions of the transverse bar 123 are mounted on the front ends of sleeves 124.

The sleeves 124 are slidably mounted in the lugs 111 extending from the sides of the housing 62. Each of these sleeves 124 carries a collar 125, and a spring 126 surrounds said sleeve, being interposed between the collar 125 and one of the lugs 111, so that the sleeves 124 are impelled rearwardly by the springs 126.

The presser bar carriage 127 is positioned in front of the transverse bar 123, and is provided with rearwardly extending rods 128 extending through the sleeves 124. The rear end of each of the rods 128 is threaded, and upon this threaded portion there is mounted a hand nut 129. The hand nuts 129 have portions which bear against the rear ends of the sleeves 124, the arrangement being such as to provide an adjustment of the presser bar carriage 127 with respect to the transverse bar 123 which carries the cam roller 121.

The transverse bar 123, and the presser bar carriage 127, are each provided with alined recesses, in which coil springs 130 are mounted, these springs 130 serving to impel the presser bar carriage 127 forwardly with respect to the cam roller bar 123, yet permitting the presser bar carriage 127 to be retracted sufficiently against the tension of the springs 130 when the presser bar 131 is brought into operation, as will be hereinafter more fully set forth.

The working surface of the cam 74 is provided with a dwell portion 132 and an extension 133 also having a dwell portion 134. An auxiliary cam member 135 is pivotally mounted upon the main cam 74 by means of a pin 136, and a suitable extending pin 137 is provided to limit the movement of said auxiliary cam member 135.

The auxiliary cam member 135 is so shaped that a portion thereof, in one position of the same with respect to the main cam member 74, projects beyond the dwell portion 134 of the extension 133 of the cam 74. The arrangement is such that when the cam 74 moves in one direction, that is to say, when the rod 70 is moved downwardly, the projecting portion of the auxiliary cam 135 will be swung rearwardly as the same encounters the roller 121, and will thereafter fall by gravity to the extending position, so that upon the return movement of the rod 70 upwardly, the extending portion of the auxiliary cam 135 will engage the roller 121 and cause the same to be given an additional forward movement to complete the pressing operation, as will be hereinafter more fully set forth.

The presser bar carriage 127 is transversely recessed to receive the presser bar 131, which is detachably secured in the recess by means of a clamping bolt 138, this arrangement being provided so that presser bars of various lengths may be substituted one for another, to accommodate different sizes of boxes.

The devices for operating upon the side flaps of the cover sheet are shown in detached detail in Figs. 14, 15 and 16 of the drawings. In Figs. 17 to 21, inclusive, the mechanism for actuating said devices is shown in enlarged detail, with the parts thereof in the positions assumed at successive stages in the operation of the machine. These devices, and the mechanism for actuating the same, are substantially the same as those for operating upon the end flaps of the cover sheet, hereinbefore described, with the addition of certain mechanism for turning the corner flaps of the end portions of the box.

By reason of the similarity of the devices for operating upon the side flaps of the cover sheet to those for operating upon the end flaps, the corresponding parts have been indicated by similar reference numerals in the drawings, with the addition in each instance, however, of the exponent "a" to indicate the similar parts of the devices for operating upon the side flaps of the cover sheet.

It should, however, be understood that the brushes and rollers for operating upon the side flaps are arranged in horizontal planes above the corresponding planes of the brushes and rollers for operating upon the end flaps, this by reason of the necessity of applying the side flaps and corner flaps to the box before the end flaps are applied thereto. By reason of this difference in location of the brush and roller carriages and the parts associated therewith, the link 75$^a$ connecting the cam 74$^a$ with the cam 78$^a$ is made correspondingly longer in the mechanism for operating upon the side flaps than in the mechanism for operating upon the end flaps.

The mechanism for turning the corner flaps is as follows: A crank member 140 is rotatably mounted on the shaft 79$^a$. The crank member 140 is provided with a cut out portion 141 into which the head of the pivot pin 77$^a$ extends. This cut out portion 141 has two bearing surfaces 142 and 143, adapted to be engaged by the head of the pivot pin 77$^a$. These bearing surfaces are suitably spaced whereby the crank member 140 is actuated only near the end of the movement of the cam 78$^a$ in either direction.

One end of a link 144 is pivotally connected by means of a pin 145 to the arm of the crank member 140. The other end of the link 144 is connected by a pin 146 to a lug 147 carried by a transverse bar 148, which is provided with rearwardly extending rods 149 slidably mounted in lugs 150 extending from the sides of the housing 62$^a$.

A bracket member 151 is adjustably mounted on each end of the bar 148, and upon this bracket member a finger carrying device 152 is pivotally mounted. The turning fingers comprise suitable plates 153 having operating ribs 154 along their forward edges, and these plates 153 are secured to the pivoted members 152 by suitable clamping bars 155 and bolts 156. Suitable springs 157 are mounted upon the pivot pins 158 by means of which the members 152 are pivoted to bracket 151, these springs 157 serving to hold the end flap turning fingers 153 in their normal operative positions, yet permitting the same to be pivotally retracted when necessary to take care of inequalities in the work.

The operation of the machine may now be explained, with particular reference to those portions thereof which constitute my present invention. At the beginning of a cycle of operations, the two-part form block is in the raised position (see Fig. 1), and likewise the platen 52 is in its uppermost position, it being noted that the two-part form block is elevated a sufficient distance above the platen to permit the box to be placed on the block.

The box B, suitably stayed, is first placed upon the form block, and the cover sheet C, with adhesive applied to the upper face thereof, is placed on the platen 52 below the form block upon which the box B is mounted as aforesaid.

The mechanism for actuating the various devices which operate upon the side flaps is shown with the parts thereof in their initial positions in Fig. 17 of the drawings, and the mechanism for actuating the various devices which operate upon the end flaps of the box is shown with the parts thereof in their initial positions in Fig. 22 of the drawings. When the several parts of the mechanism illustrated in Figs. 17 and 22, respectively, are in the positions there shown, the devices for operating upon the side and end flaps are in their most retracted positions. The sleeve 58 which carries the horizontally extending arms 61 is at this period in its uppermost position.

Figure 29:
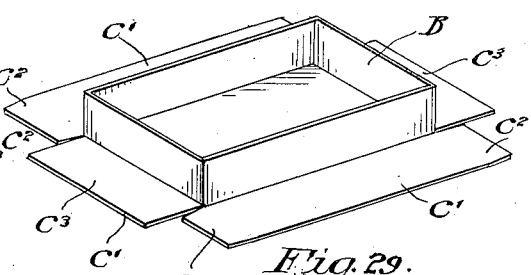
Figure 30:
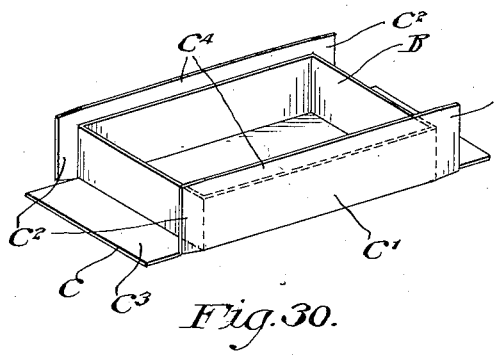
Figure 31:
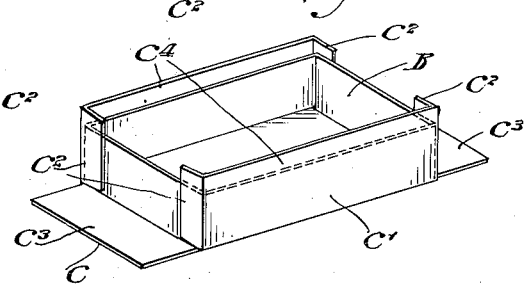
Figure 32:
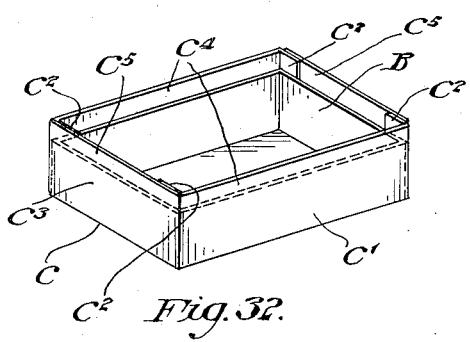
Figure 33:
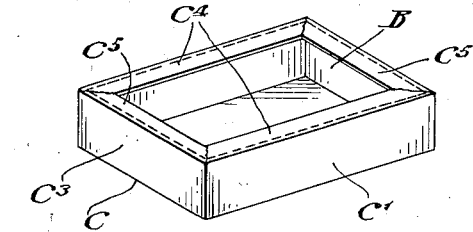
Figure 34:
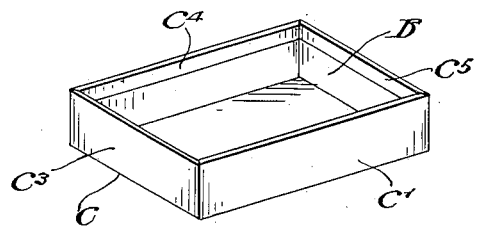

The first action of the machine is to cause the form blocks, with the stayed box B mounted thereon, to descend until the lower face of the box engages the central portion of the cover sheet C, (see Fig. 29). The platen 52 and the form blocks 48 and 49 then continue to descend past the various devices for operating upon the side and end flaps, stopping when necessary to permit the several operations to be performed. Meanwhile, the sleeve 58 is lowered by the lever 56 to bring the parts of the mechanism for actuating the cover applying devices to the positions shown in Figs. 18 and 23 of the drawings.

It will be noted that the rack teeth 71$^a$ carried by the vertical rods 70$^a$ engaging the pinions 72$^a$, will cause the cam members 74$^a$ to be slightly rotated, and by reason of the connection of these cam members 74$^a$ with the cam members 78$^a$, by means of the links 75$^a$, the cams 78$^a$ will be brought to such positions as to push the rollers 80$a$, inwardly, and in this manner the brush and roller carriages 81$^a$ will be moved forwardly to cause the brushes 86$^a$ and rollers 89$^a$ which operate upon the side flaps of the cover sheet to be brought to the operative positions.

Likewise the vertical rods 70 will be simultaneously lowered, the teeth 71 thereof causing the pinions 72 to rotate the cam members 74 and thus bring about the rotation of the cam members 78 by means of the connecting link 75. Hence the carriages 81, for carrying the brushes 86 and rollers 89 for operating upon the end flaps, will also be brought to the operative positions, so that their brushes and rollers may subsequently engage the end flaps of the cover sheet and apply the same to the box.

The box B, with the cover sheet C properly positioned thereon, is then moved downwardly, so that the brushes 86$^a$ first engage the side flaps C$^1$, and thereafter the rollers 89$^a$ apply the requisite pressure to insure the proper adhesion of the side flaps C$^1$ to the box.

While the cams are being moved as aforesaid, the extending heads of the pivot pins 77$^a$ will pass through the cut-out portions 141 of the crank members 140 until they engage the bearing surfaces 142, so that as the movement continues, until the parts for actuating the devices for operating upon the side and end flaps of the cover sheet are brought to the positions shown in Figs. 19 and 24 of the drawings, the crank members 140 will be actuated by the extending heads of the pivot pins 77$^a$.

While this action takes place, the box B and cover sheet C are momentarily held at rest, so that the corner flaps C$^2$ may be turned inwardly, to be applied to the ends of the box. This is accomplished by means of the turning fingers 153 which are carried by the bracket members 151 mounted upon the transverse bar 148 which is connected by means of the link 144 to the arm of the crank member 140.

The box and cover sheet then continue downwardly in their movement, past the brushes 86 and rollers 89, which cause the end flaps C$^3$ to be applied to the end portions of the box, the box being then brought to its lowermost position in the machine.

The vertical rods 70 and 70$^a$ continue in their downward movement until the parts for actuating the cover applying devices are brought to the positions shown in Figs. 20 and 25 of the drawings, the vertical rods 70 and 70$^a$ being then in their lowermost positions. When this occurs, the pins 100 and 100$^a$ carried by the upper ends of the rods 70 and 70$^a$, engage the projecting fingers 102 and 102$^a$, of the rotatable members 101 and 101a, respectively, causing the same to be given a rotating movement and thereby, through the links 106 and 106a, the carriages 114 and 114a, which carry the folding fingers 113 and 113a, respectively, are moved inwardly to cause these fingers to push the upwardly extending portions $C^4$ of the side flaps and the upwardly extending portions $C^5$ of the end flaps of the cover sheet to horizontal positions.

Prior to this movement, the auxiliary form block 49 has been raised in the usual manner above the main form block 48. Afterward, the auxiliary form block is lowered to complete the inturning of the edge portions $C^4$ and $C^5$ of the side and end flaps, respectively, of the cover sheet also in the usual manner.

Simultaneously with the inward movement of the folding fingers 113 and 113a, the cams 74 and 74a, against which the rollers 121 and 121a, respectively, bear, push these rollers inwardly, thereby bringing the presser bars 131 and 131a adjacent the outer surface of the covered box. It should here be noted that as the cams 74 and 74a move to the positions aforesaid, the pivoted auxiliary cam members 135 and 135a will swing backwardly, so as to pass the rollers 121 and 121a. As soon as the auxiliary cam members 135 and 135a pass these rollers, they fall by gravity to the positions shown in Figs. 20, 21, 25 and 26 of the drawings.

The sleeve 58 is now given a reverse movement upwardly, causing the rotatable members 101 and 101a to retract the folding fingers, 113 and 113a, respectively, this being done before the auxiliary form block 49 is brought down to cause the inturning of the edge portions $C^4$ and $C^5$ of the side and end flaps, respectively, of the cover sheet. Thereafter the projecting portions of the auxiliary cam members 135 and 135a engage the rollers 121 and 121a, as indicated in Figs. 21 and 26 of the drawings, to cause the pressure bars 131 to impart an additional pressure to the upper edge portions of the box, by pressing the same against the auxiliary form block 49, which as before mentioned, has been lowered to a position where this can be accomplished.

The vertical rods 70 and 70a then continue to their uppermost positions, whereby the various parts are again brought to their initial positions.

After the devices for operating upon the side and end flaps of the cover sheet are retracted as aforesaid, the form blocks and the platen are raised to their uppermost positions, as shown in Fig. 1 of the drawings. The covered box may then be removed from the form blocks, whereupon the machine is in a condition for a repetition of the operations.

It will be noted that by the provision of the mechanism hereinbefore described, the devices for operating upon the side and end flaps of the cover sheet may be retracted a much greater distance than has been possible by the mechanism heretofore employed for such purpose, and the advantages of this will be obvious to those skilled in the art.

Furthermore, by this arrangement, ample bearing surfaces of the working parts will be provided, and better coaction of the several parts obtained, principally by reason of the greater extent of movement of the various parts, which permits a better shaping of the cams and other parts of the mechanism.

I claim:

1. In a box covering machine having a plurality of sets of devices for applying the side, corner and end flaps of a cover sheet to a box; the actuating means for each set of said devices comprising a rack, a pinion meshing with said rack, and mechanism connected to said pinion for operating the flap applying devices; and means for actuating said racks comprising a vertically movable member and a plurality of horizontal arms carried thereby, each of said racks being connected to one of said arms.

2. In a box covering machine having a plurality of sets of devices for applying the side, corner and end flaps of a cover sheet to a box; the actuating means for each set of said devices comprising a vertically movable rod, a rack carried thereby, a pinion meshing with said rack, and mechanism connected to said pinion for operating said flap applying devices; and means for actuating said rods comprising a vertically movable member and a plurality of horizontal arms carried thereby, each of said rods being connected to one of said arms.

3. In a box covering machine having a plurality of sets of devices for applying the side, corner and end flaps of a cover sheet to a box and for pressing inturned edge portions of said flaps; the actuating means for each set of said devices comprising a vertically movable rod, a rack carried thereby, a pinion meshing with said rack, and mechanism connected to said pinion for operating the flap applying devices and the pressing device; and means for actuating said rods comprising a vertically movable member and a plurality of horizontal arms carried thereby, each of said rods being connected to one of said arms.

4. In a box covering machine having a plurality of sets of devices for applying the side, corner and end flaps of a cover sheet to a box and for inturning and pressing the edge portions of said flaps; the actuating means for each set of said devices comprising a vertically movable rod, a rack carried thereby, a pinion meshing with said rack, mechanism connected to said pinion for operating the flap applying devices and the pressing device, a rotatable member connected to the inturning device, and a pin connection between the rod and the rotatable member to actuate said rotatable member.

5. In a box covering machine having a plurality of sets of devices for applying the side, corner and end flaps of a cover sheet to a box and for inturning and pressing the edge portions of said flaps, the actuating means for each set of said devices comprising a vertically movable rod, a rack carried thereby, a pinion meshing with said rack, mechanism connected to said pinion for operating the flap applying devices and the pressing device, a rotatable member connected to the inturning device, and a pin carried by the rod engaging a portion of the rotatable member to actuate the same.

6. In a box covering machine having a plurality of sets of devices for applying the side, corner and end flaps of a cover sheet to a box; each set of said devices including a brush and roller for applying the side flaps, a carriage for supporting said brush and roller, springs for impelling said carriage in one direction, a cam for moving said carriage in the other direction, and means for rotating said cam.

7. In a box covering machine having a plurality of sets of devices for applying the side, corner and end flaps of a cover sheet to a box, each set of said devices including a brush and roller for applying the side flaps, a carriage for supporting said brush and roller, springs for impelling said carriage in one direction, a cam for moving said carriage in the other direction, and means for rotating said cam comprising a pinion connected thereto, a rack meshing with said pinion, and means for actuating said rack.

8. In a box covering machine having a plurality of sets of devices for applying the side, corner and end flaps of a cover sheet to a box; each set of said devices including a brush and roller for applying the side flaps, a carriage for supporting said brush and roller, springs for retracting said carriage, a cam for moving said carriage forwardly to bring the brush and roller to their operative positions, and means for rotating said cam.

9. In a box covering machine having a plurality of sets of devices for applying the side, corner and end flaps of a cover sheet to a box; each set of said devices including a brush and roller for applying the side flaps, a carriage for supporting said brush and roller, springs for retracting said carriage, a cam for moving said carriage forwardly to bring the brush and roller to their operative positions, means for rotating said cam; fingers for applying the corner flaps, and means for actuating said fingers connected with the cam for actuating the brush and roller carriage.

10. In a box covering machine having a plurality of sets of devices for applying the side, corner and end flaps of a cover sheet to a box; each set of said devices including a brush and roller for applying the side flaps, a carriage for supporting said brush and roller, springs for retracting said carriage, a cam for moving said carriage forwardly to bring the brush and roller to their operative positions, and means for rotating said cam; fingers for applying the corner flaps, and means connected with the cam for actuating the brush and roller carriage for actuating said fingers after said cam has moved the brush and roller carriage to its forward position.

11. In a box covering machine having a plurality of sets of devices for applying the side, corner and end flaps of a cover sheet to a box; each set of said devices including a brush and roller for applying the side flaps, a carriage for supporting said brush and roller, springs for retracting said carriage, a cam for moving said carriage forwardly to bring the brush and roller to their operative positions, and means for rotating said cam; fingers for applying the corner flaps, a movable support upon which said fingers are mounted, a rotatable member connected to said support for advancing and retracting it, and a lost motion connection between said rotatable member and the cam for actuating the brush and roller carriage whereby said rotatable member will be actuated after said cam has moved the brush and roller carriage to its forward position.

12. In a box covering machine having a plurality of sets of devices for applying the side, corner and end flaps of a cover sheet to a box; each set of said devices including a brush and roller for applying the side flaps, a carriage for supporting said brush and roller, springs for retracting said carriage, a cam for moving said carriage forwardly to bring the brush and roller to their operative positions, and means for rotating said cam; fingers for applying the corner flaps, a movable support upon which said fingers are mounted, a rotatable member connected to said support for advancing and retracting it, and a pin carried by the cam for actuating the brush and roller carriage, said pin extending into a cut-out portion of said rotatable member and adapted to engage surfaces at the ends of said cut-out portion thereby to actuate said rotatable member near the end of the movement of said cam in one direction.

13. In a box covering machine having a plurality of sets of devices for applying the side, corner and end flaps of a cover sheet to a box and for inturning the edge portions of said flaps; the inturning device comprising a finger, a movable carriage in which said finger is mounted, a rotatable member connected to said finger carriage, a vertically movable rod, and a connection between said rod and said rotatable member for actuating the same; and means for actuating said rods comprising a vertically movable member and a plurality of horizontal arms carried thereby, each of said rods being connected to one of said arms.

14. In a box covering machine having a plurality of sets of devices for applying the side, corner and end flaps of a cover sheet to a box and for inturning the edge portions of said flaps; the inturning device comprising a finger, a movable carriage in which said finger is mounted, a rotatable member connected to said finger carriage, a vertically movable rod primarily adapted for actuating the other parts of the device, a connection between said rod and said rotatable member for actuating the same, and resilient means interposed in the connection between the rotatable member and the finger carriage.

15. In a box covering machine having a plurality of sets of devices for applying the side, corner and end flaps of a cover sheet to a box and for inturning the edge portions of said flaps; the inturning device comprising a finger, a movable carriage in which said finger is mounted, a rotatable member connected to said finger carriage, a vertically movable rod primarily adapted for actuating the other parts of the device, and a pin carried by said rod for actuating said rotatable member.

16. In a box covering machine having a plurality of sets of devices for applying the side, corner and end flaps of a cover sheet to a box and for inturning the edge portions of said flaps; the inturning device comprising a finger, a movable carriage in which said finger is mounted, a rotatable member connected to said finger carriage, a vertically movable rod primarily adapted for actuating the other parts of the device, a pin carried by said rod for actuating said rotatable member, and resilient means interposed in the connection between the rotatable member and the finger carriage.

17. In a box covering machine having a plurality of sets of devices for applying the side, corner and end flaps of a cover sheet to a box and for pressing the edge portions of said flaps; the pressing device including a presser bar, a movable carriage in which said presser bar is mounted, and means for moving said carriage forwardly and backwardly; and rack and pinion mean for actuating said carriage moving means; and means for actuating the racks of said means comprising a vertically movable member and a plurality of horizontal arms carried thereby, each of said racks being connected to one of said arms.

18. In a box covering machine having a plurality of sets of devices for applying the side, corner and end flaps of a cover sheet to a box and for pressing the edge portions of said flaps; the pressing device including a presser bar, a movable carriage in which said presser bar is mounted, springs for retracting said carriage, a cam for moving said carriage forwardly, and an auxiliary cam member pivotally mounted on the cam and adapted upon return movement of the cam to impart additional movement to the presser bar; a pinion secured to the cam, a rack meshing with said pinion, and a vertically movable rod carrying said rack.

19. In a box covering machine having a plurality of sets of devices for applying the side, corner and end flaps of a cover sheet to a box and for pressing the edge portions of said flaps; the pressing device including a presser bar, a movable carriage in which said presser bar is mounted, springs for retracting said carriage, a cam for moving said carriage forwardly, a pinion secured to said cam, a rack meshing with said pinion, and a vertically movable rod carrying said rack; and means for actuating said rods comprising a vertically movable member and a plurality of horizontal arms carried thereby, each of said rods being connected to one of said arms.

20. In a box covering machine having a plurality of sets of devices for applying the side, corner and end flaps of a cover sheet to a box and for pressing the edge portions of said flaps; the pressing device including a presser bar, a movable carriage in which said presser bar is resiliently and adjustably mounted, springs for retracting said carriage, and a cam for moving said carriage forwardly, a pinion secured to said cam, a rack meshing with said pinion, and a vertically movable rod carrying said rack.

21. In a box covering machine having a plurality of sets of devices for applying the side, corner and end flaps of a cover sheet to a box and for pressing the edge portions of said flaps; the pressing device including a presser bar, a movable carriage in which said presser bar is resiliently and adjustably mounted, springs for retracting said carriage, a cam for moving said carriage forwardly, and an auxiliary cam member movably mounted on the cam and adapted upon return movement of the cam to impart additional movement to the presser bar.

22. In a box covering machine having a plurality of sets of devices for applying the side, corner and end flaps of a cover sheet to a box and for inturning and pressing the edge portions of said flaps; the actuating means for each set of said devices comprising two parallel shafts, means mounted on one of said shafts for operating certain of said devices, means mounted on the other shaft for operating others of said devices, means for actuating the means on one shaft, and a link in direct pivotal connection with a member on one shaft and with a member on the other shaft whereby said shafts will be actuated in unison.

23. In a box covering machine having a plurality of sets of devices for applying the side, corner and end flaps of a cover sheet to a box and for inturning and pressing the edge portions of said flaps, the actuating means for each set of said devices comprising two horizontally disposed parallel shafts, means mounted on one of said shafts for operating certain of said devices, means mounted on the other shaft for operating others of said devices, means for actuating the means on one shaft, and a link in direct pivotal connection with a member on one shaft and with a member on the other shaft whereby said shafts will be actuated in unison.

24. In a box covering machine having a plurality of sets of devices for applying the side, corner and end flaps of a cover sheet to a box and for inturning and pressing the edge portions of said flaps, the actuating means for each set of said devices comprising two horizontally disposed parallel shafts, means mounted on one of said shafts for operating certain of said devices, means mounted on the other shaft for operating others of said devices, rack and pinion mechanism connected to the means on one shaft for actuating the same, and a link in direct pivotal connection with a member on one shaft and with a member on the other shaft whereby said shafts will be actuated in unison.

25. In a box covering machine having a plurality of sets of devices for applying the side, corner and end flaps of a cover sheet to a box and for inturning and pressing the edge portions of said flaps, the actuating means for each set of said devices comprising two horizontally disposed parallel shafts, means mounted on one of said shafts for operating certain of said devices, means mounted on the other shaft for operating others of said devices, a pinion connected to the means on one shaft, a rack for actuating the same, and a link in direct pivotal connection with a member on one shaft and with a member on the other shaft whereby said shafts will be actuated in unison.

HENRY A. ARMBRUSTER.